(12) United States Patent
Abe et al.

(10) Patent No.: US 9,177,724 B2
(45) Date of Patent: Nov. 3, 2015

(54) MULTILAYER CERAMIC ELECTRONIC COMPONENT AND A METHOD FOR MANUFACTURING THE SAME

(75) Inventors: Tomoro Abe, Nagaokakyo (JP); Masato Nishioka, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 986 days.

(21) Appl. No.: 13/241,863

(22) Filed: Sep. 23, 2011

(65) Prior Publication Data

US 2012/0073129 A1 Mar. 29, 2012

(30) Foreign Application Priority Data

Sep. 28, 2010 (JP) ................. 2010-216466
Aug. 10, 2011 (JP) ................. 2011-174927

(51) Int. Cl.
*H01G 4/30* (2006.01)
*H01G 4/232* (2006.01)
*H01G 4/08* (2006.01)

(52) U.S. Cl.
CPC ............... *H01G 4/232* (2013.01); *H01G 4/08* (2013.01); *H01G 4/30* (2013.01); *Y10T 29/49117* (2015.01)

(58) Field of Classification Search
USPC .............. 361/303, 301.4, 306.3, 309, 311
See application file for complete search history.

(56) References Cited

U.S. PATENT DOCUMENTS

| | | | | |
|---|---|---|---|---|
| 4,819,128 A | * | 4/1989 | Florian et al. | 361/321.3 |
| 2006/0007634 A1 | * | 1/2006 | Togashi et al. | 361/306.3 |
| 2009/0034153 A1 | * | 2/2009 | Togashi | 361/302 |
| 2009/0154055 A1 | * | 6/2009 | Takashima et al. | 361/301.4 |
| 2010/0085682 A1 | | 4/2010 | Abe et al. | |

FOREIGN PATENT DOCUMENTS

| | | |
|---|---|---|
| JP | 62-111411 A | 5/1987 |
| JP | 06-349669 A | 12/1994 |
| JP | 08-069943 A | 3/1996 |
| JP | 10-189305 A | 7/1998 |
| JP | 2002-219644 A | 8/2002 |
| JP | 2002-299148 A | 10/2002 |
| JP | 2004-047536 A | 2/2004 |
| JP | 2004-179531 A | 6/2004 |
| JP | 2007-134377 A | 5/2007 |
| JP | 2008-071909 A | 3/2008 |

(Continued)

OTHER PUBLICATIONS

Nishioka et al., "Multilayer Ceramic Electronic Component,", U.S. Appl. No. 13/241,875, filed Sep. 23, 2011.

(Continued)

*Primary Examiner* — Jenny L Wagner
*Assistant Examiner* — Michael P McFadden
(74) *Attorney, Agent, or Firm* — Keating & Bennett, LLP

(57) ABSTRACT

In a method of manufacturing a multilayer ceramic electronic component, polishing is performed so that intersection lines extending from external surfaces of a green element body and interfaces between a green chip to be formed into a laminate portion and ceramic side surface layers are each located within a curved-surface formation range of a chamfer portion. Accordingly, since a green ceramic material is extended so as to fill the interfaces like so-called "putty", and the adhesive strength between the green chip to be formed into the laminate portion and each of the ceramic side surface layers is increased.

2 Claims, 16 Drawing Sheets

(56) References Cited

FOREIGN PATENT DOCUMENTS

| | | |
|---|---|---|
| JP | 2008-227314 A | 9/2008 |
| JP | 2010-092896 A | 4/2010 |

OTHER PUBLICATIONS

Official Communication issued in corresponding Japanese Patent Application No. 2011-174927, mailed on Jan. 7, 2014.

* cited by examiner

MULTILAYER CERAMIC ELECTRONIC COMPONENT AND A METHOD FOR MANUFACTURING THE SAME

BACKGROUND OF THE INVENTION

1. Field of the Invention

The present invention relates to a multilayer ceramic electronic component and a method for manufacturing the same. In particular, the present invention relates to a multilayer ceramic electronic component in which a green ceramic material is provided after a laminating step to form side gap regions in association with internal electrodes of an element body and to a method for manufacturing the multilayer ceramic electronic component.

2. Description of the Related Art

In recent years, small portable electronic apparatuses, such as a cellular phone, a notebook personal computer, a digital camera, and a digital audio apparatus, have been increasingly in demand. Miniaturization of these portable electronic apparatuses is progressing, and at the same time, improvement in performance thereof is also progressing. Since many multilayer ceramic electronic components are mounted in these portable electronic apparatuses, improvement in performance is also required for the multilayer ceramic electronic components, and for example, an increase in capacity is required for multilayer ceramic capacitors. In response to this requirement, in the multilayer ceramic capacitor, a decrease in thickness of a ceramic layer has been carried out, and as a result, the number of ceramic layers to be laminated tends to be increased.

In general, a multilayer ceramic electronic component is manufactured in such a way that after internal electrode patterns are printed on ceramic green sheets to be formed into ceramic layers after firing, the ceramic green sheets are laminated to each other so as to shift the internal electrode patterns in a predetermined direction to form a mother block, and this mother block is cut into green chips each having a predetermined dimension.

In this manufacturing method, in order to prevent the internal electrode patterns from being exposed to side surfaces of the green chip caused by misalignment generated in a laminating and/or a cutting step, a margin of each side gap region between the side surface of the green chip and the side of the internal electrode pattern must be ensured. However, when miniaturization of the multilayer ceramic electronic component is performed, the ratio of the area of the side gap region to the area of the internal electrode is increased, and as a result, the capacity of the multilayer ceramic capacitor is inevitably decreased in an amount corresponding to the above increase in ratio.

In order to solve the above problem, Japanese Unexamined Patent Application Publication No. 6-349669 has disclosed that after a laminate is prepared in which two side ends of internal electrodes are exposed to side surfaces of the laminate, since ceramic green sheets are adhered to these side surfaces thereof to form side gap regions, miniaturization of a multilayer capacitor and an increase in capacity thereof can be achieved.

However, according to the technique disclosed in Japanese Unexamined Patent Application Publication No. 6-349669, the adhesive strength between the ceramic green sheet forming the side gap region and the green chip is not sufficient, and as the time passes by, the side gap region may be peeled off from a ceramic base body in some cases.

In addition, a problem similar to that described above may occur not only in multilayer ceramic capacitors but also in multilayer ceramic electronic components other than the multilayer ceramic capacitors.

SUMMARY OF THE INVENTION

Accordingly, preferred embodiments of the present invention provide a multilayer ceramic electronic component and a method of manufacturing thereof solve the problems described above.

According to a preferred embodiment of the present invention, a method for manufacturing a multilayer ceramic electronic component includes the steps of: forming an element body which includes a pair of principal surfaces facing each other, a pair of side surfaces facing each other, and a pair of end surfaces facing each other, rounded chamfer portions arranged along ridgelines between the side surfaces and the end surfaces, and a plurality of ceramic layers extending in a principal surface direction and laminated in a direction perpendicular or substantially perpendicular thereto and a plurality of pairs of internal electrodes which are arranged along interfaces between the ceramic layers, which have exposure ends each exposed to one of the pair of end surfaces, and which are not exposed to the side surfaces; and forming external electrodes at least on the pair of end surfaces of the element body so as to be electrically connected to the exposure ends of the internal electrodes.

The above step of forming an element body preferably includes the steps of preparing a green chip which includes parallel or substantially parallel side surfaces located inside and parallel or substantially parallel to the side surfaces of the element body and which has a laminate structure formed of a plurality of green ceramic layers and a plurality of pairs of green internal electrodes so that the green internal electrodes are exposed to the parallel or substantially parallel side surfaces; forming ceramic side surface layers on the parallel or substantially parallel side surfaces of the green chip to form the side surfaces of the element body by supplying a green ceramic material on the parallel or substantially parallel side surfaces of the green chip so as to cover the green internal electrodes exposed to the parallel or substantially parallel side surfaces; polishing the green chip provided with the ceramic side surface layers to obtain a green element body having chamfer portions; and firing the green element body.

In addition, according to preferred embodiments of the present invention, in order to solve the above technical problems, in the above polishing step, intersection lines each extending from the interface between the green chip and the ceramic side surface layer and an external surface of the green element body are formed so as to be located within respective curved-surface formation ranges of the chamfer portions.

In the manufacturing method according to a preferred embodiment of the present invention, in order to prepare the green chip, when a step forming a plurality of lines of internal electrode patterns each having a substantially belt shape on ceramic green sheets, a step of laminating the ceramic green sheets to form a mother block while the ceramic green sheets are shifted by predetermined intervals along a width direction perpendicular to a longitudinal direction in which the belt-shaped electrode patterns extend, and a step of cutting the mother block along imaginary cutting lines in the longitudinal direction and imaginary cutting lines in the width direction are performed, at least one green chip can be efficiently obtained.

In the above preferred embodiments, the belt-shaped internal electrode pattern includes one pair of sides linearly extending along the longitudinal direction, and the imaginary cutting line in the longitudinal direction may be located so as to equally divide the belt-shaped internal electrode pattern into two portions in the width direction.

In this case, when the belt-shaped internal electrode pattern includes hole portions in which no internal electrode pattern is formed, the hole portions are provided at the center or approximate center of the belt-shaped internal electrode pattern in the width direction with predetermined pitches along the longitudinal direction, and the imaginary cutting line in the longitudinal direction is located so as to equally divide the hole portion into two portions in the width direction, as for the shape of the internal electrode, the width of the exposure end of an extending portion can be decreased as compared with that of the other portions thereof when viewed in a width direction between the side surfaces.

In the preferred embodiments described above, the belt-shaped internal electrode pattern preferably includes one pair of zigzag sides extending along the longitudinal direction so as to be engaged with adjacent belt-shaped internal electrode patterns, a zigzag gap region extending in the longitudinal direction is formed between adjacent belt-shaped internal electrode patterns, and the imaginary cutting line in the longitudinal direction may be located so as to equally divide the gap region into two portions in the width direction.

According to another preferred embodiment of the present invention, a multilayer ceramic electronic component includes an element body which includes a pair of principal surfaces facing each other, a pair of side surfaces facing each other, and a pair of end surfaces facing each other, rounded chamfer portions arranged along ridgelines between the side surfaces and the end surfaces, and a plurality of ceramic layers extending in a principal surface direction and laminated in a direction perpendicular or substantially perpendicular thereto and a plurality of pairs of internal electrodes which are provided along interfaces between the ceramic layers, which include exposure ends each exposed to one of the pair of end surfaces, and which are not exposed to the side surfaces; and external electrodes provided at least on the pair of end surfaces of the element body so as to be electrically connected to the exposure ends of the internal electrodes.

The internal electrodes each include a facing portion including a pair of sides parallel or substantially parallel to the side surfaces and facing an adjacent internal electrode with at least one of the ceramic layers interposed therebetween and an extending portion extending from the facing portion to the end surface to define the exposure end at the end of the extending portion. The width of the exposure end of the extending portion is preferably smaller than that of the facing portion when viewed in a width direction between the side surfaces.

In addition, when a gap dimension from the side of the facing portion to the side surface of the element body is represented by Wg, the curvature radius of a curved surface of the chamfer portion is represented by Rd, and the distance from the side of the facing portion to the exposure end is represented by D, Wg<Rd and Rd<Wg+D are satisfied.

In the multilayer ceramic electronic component according to preferred embodiments of the present invention, 15 µm≤Wg and 55 µm≤Rd are preferably satisfied.

In the method for manufacturing a multilayer ceramic electronic component according to a preferred embodiment of the present invention, since polishing is performed so that the intersection line formed from the interface between the green chip and the ceramic side surface layer and the external surface of the green element body is located within the curved-surface formation range of the chamfer portion, the green ceramic material forming the green chip and/or the ceramic side surface layer is extended so as to fill the interface between the green chip and the ceramic side surface layer. Therefore, this green ceramic material functions as so-called "putty", and as a result, the adhesive strength between the green chip and the ceramic side surface layer is increased, and peeling (gap peeling) between the green chip and the ceramic side surface layer is prevented.

In the multilayer ceramic electronic component according to a preferred embodiment of the present invention, Wg<Rd and Rd<Wg+D are preferably satisfied, that is, the exposure end of the extending portion does not extend to the curved-surface formation range of the chamfer portion. In the chamfer portion, since the thickness of an underlayer of the external electrode formed thereon is liable to be small, when the extending portion is exposed thereto, the moisture resistance is likely to be degraded. However, according to preferred embodiments of the present invention, the moisture resistance is prevented from being degraded.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
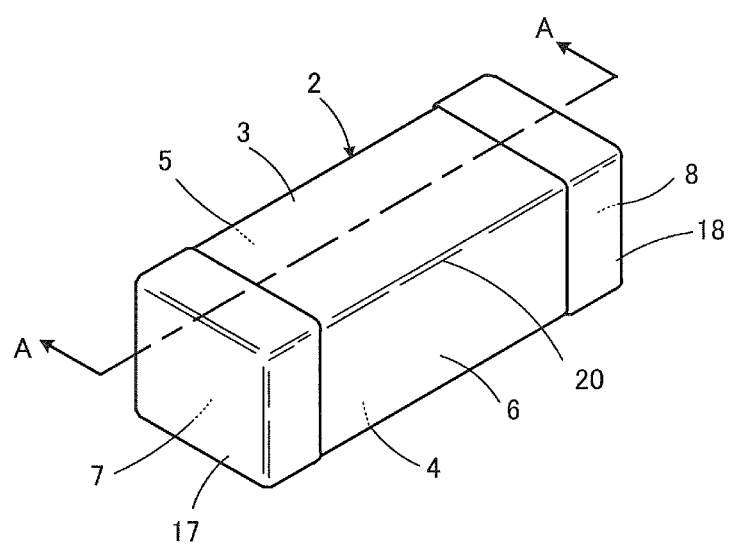
FIG. 1 is a perspective view showing the appearance of a multilayer ceramic capacitor as a multilayer ceramic electronic component according to a first preferred embodiment of the present invention.

Hereinafter, for description of preferred embodiments of the present invention, as a multilayer ceramic electronic component, a multilayer ceramic capacitor will be described by way of example.

FIGS. 1 to 9 are views illustrating a first preferred embodiment of the present invention.

First, as shown in FIGS. 1 to 5, a multilayer ceramic capacitor 1 includes an element body 2. The element body 2 includes one pair of principal surfaces 3 and 4 facing each other, one pair of side surfaces 5 and 6 facing each other, and one pair of end surfaces 7 and 8 facing each other and has an approximately rectangular parallelepiped shape, for example.

Figure 2:
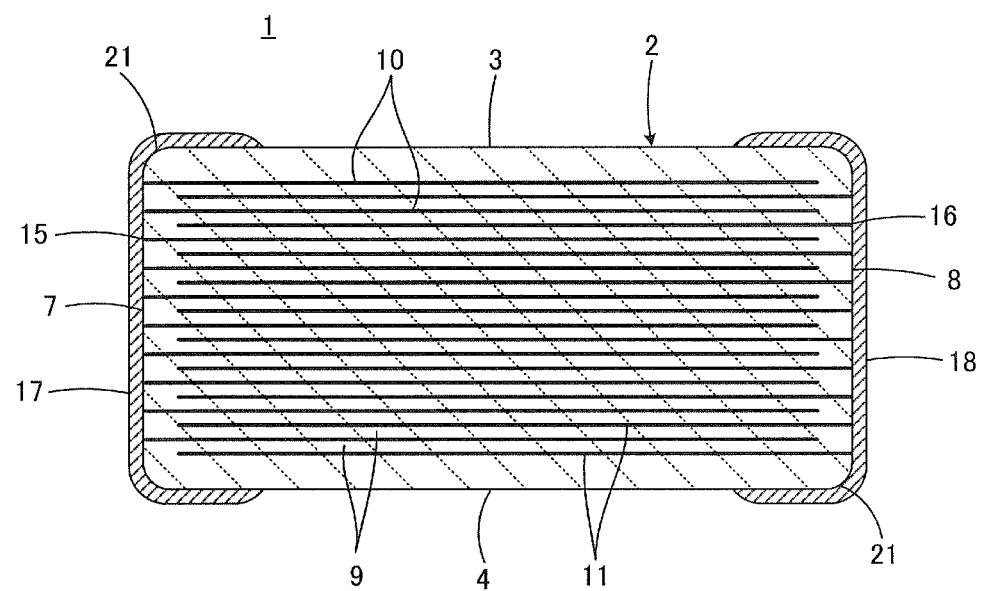
FIG. 2 is a cross-sectional view taken along the line A-A of FIG. 1.
Figure 5:
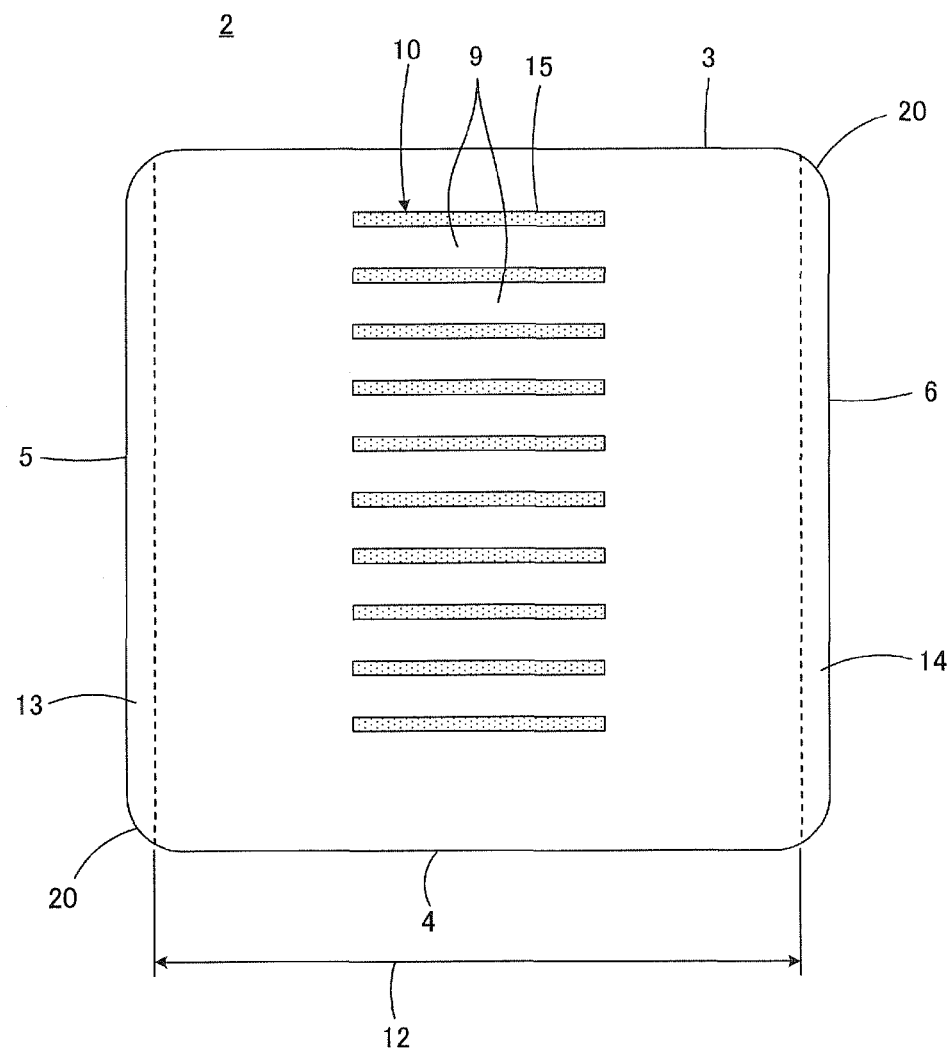
FIG. 5 is an end view of the element body of the multilayer ceramic capacitor shown in FIG. 1.

As shown in FIGS. 2 and 5, the element body 2 includes a laminate portion 12 of a laminate structure including a plurality of ceramic layers 9 extending in the direction of the principal surfaces 3 and 4 and laminated in the direction perpendicular or substantially perpendicular to the principal surfaces 3 and 4 and a plurality of pairs of first and second internal electrodes 10 and 11 arranged along the interfaces between the ceramic layers 9. In addition, as shown in FIG. 5, the element body 2 includes one pair of ceramic side surface layers 13 and 14 provided on the respective side surfaces of the laminate portion 12 so as to define the pair of side surfaces 5 and 6 described above. The ceramic side surface layers 13 and 14 preferably have the same thickness.

Although the details of the shapes of the internal electrodes 10 and 11 will be described later, the first internal electrode 10 includes an exposure end 15 exposed to the first end surface 7, and the second internal electrode 11 includes an exposure end 16 exposed to the second end surface 8. However, since the ceramic side surface layers 13 and 14 described above define side gap regions, the internal electrodes 10 and 11 are not exposed to the side surfaces 5 and 6 of the element body 2.

Furthermore, the multilayer ceramic capacitor 1 includes external electrodes 17 and 18 provided at least on the pair of end surfaces 7 and 8 of the element body 2 so as to be electrically connected to the respective exposure ends 15 and 16 of the internal electrodes 10 and 11.

Figure 3:
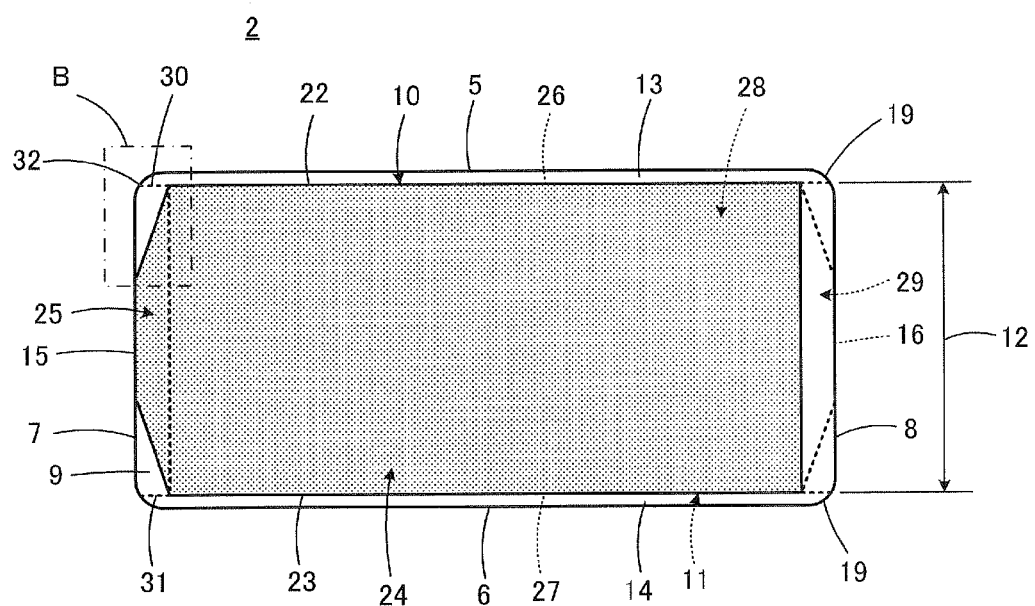
FIG. 3 is a plan view showing an internal structure of an element body of the multilayer ceramic capacitor shown in FIG. 1.
Figure 4:
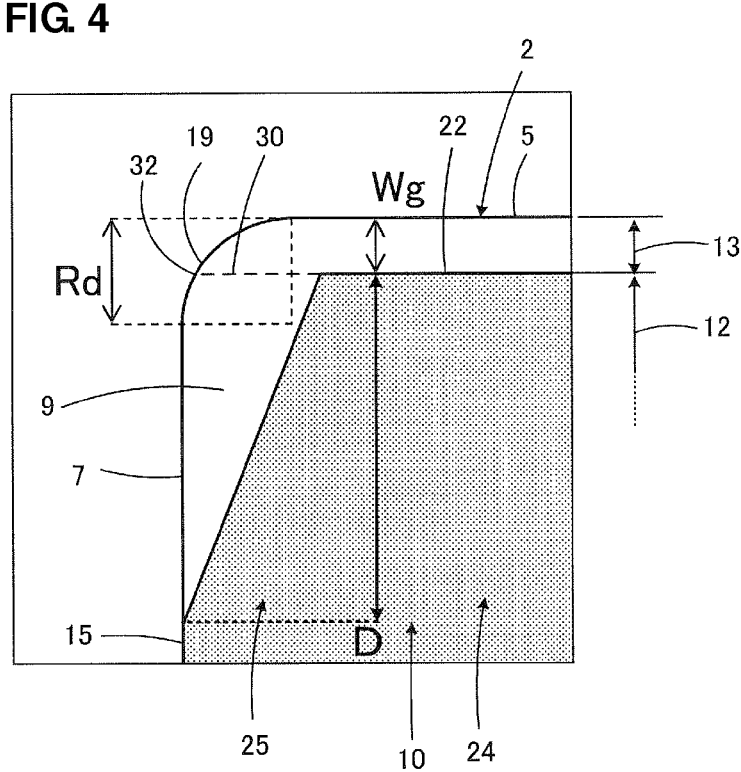
FIG. 4 is an enlarged view of the portion B shown in FIG. 3.

In the element body 2, rounded chamfer portions 19 are arranged along the ridgelines between the side surfaces 5 and 6 and the end surfaces 7 and 8 as shown in FIGS. 3 and 4; rounded chamfer portions 20 are arranged along the ridgelines between the principal surfaces 3 and 4 and the side surfaces 5 and 6 as shown in FIGS. 1 and 5; and furthermore, as shown in FIG. 2, rounded chamfer portions 21 are arranged along the ridgeline between the principal surfaces 3 and 4 and the end surfaces 7 and 8.

As clearly shown in FIG. 3, the first internal electrode 10 includes a facing portion 24 including a pair of sides 22 and 23 parallel or substantially parallel to the side surfaces 5 and 6 and facing the second internal electrode 11 with at least one ceramic layer 9 interposed therebetween and an extending portion 25 extending from the facing portion 24 to the first end surface 7 to provide the exposure end 15 at the end of the extending portion. The exposure end 15 of the first internal electrode 10 exposed to the first end surface 7 is shown in FIG. 5.

In the plan shape of the first internal electrode 10, when viewed in the width direction between the side surfaces 5 and 6, the width of the exposure end 15 of the extending portion 25 is preferably smaller than the width of the facing portion 24. In particular, in this preferred embodiment, the extending portion 25 has a width direction dimension which is gradually decreased toward the end surface 7.

As in the case described above, the second internal electrode 11 shown by the dotted line in FIG. 3 also includes a facing portion 28 including a pair of sides 26 and 27 parallel or substantially parallel to the side surfaces 5 and 6 and facing the first internal electrode 10 with at least one ceramic layer 9 interposed therebetween and an extending portion 29 extending from the facing portion 28 to the second end surface 8 to provide the exposure end 16 at the end of the extending portion. The second internal electrode 11 has a plan shape symmetrical to that of the first internal electrode 10 described above.

As described above, since the facing portion 24 of the first internal electrode 10 and the facing portion 28 of the second internal electrode 11 face each other with at least one ceramic layer 9 interposed therebetween, electrical properties are obtained between these facing portions 24 and 28. That is, in the case of this multilayer ceramic capacitor 1, an electrostatic capacity is formed.

The facing portion 24 of the first internal electrode 10 is substantially flat in the direction between the sides 22 and 23. That is, the facing portion 24 does not get thin in the vicinities of the sides 22 and 23 and does not warp in the laminate direction. The facing portion 28 of the second internal electrode 11 is also provided as described above.

The extending portions 25 and 29 of the first and the second internal electrodes 10 and 11 are extended to the end surfaces 7 and 8, respectively. At this stage, as shown in FIG. 4, when a gap dimension from the side 22 of the facing portion 24 to the side surface 5 of the element body 2 is represented by Wg, the curvature radius of the curved surface of the chamfer portion 19 is represented by Rd, and the distance from the side 22 of the facing portion 24 to the end of the exposure end 15 is represented by D, Rd<Wg+D is satisfied. That is, the exposure ends 15 and 16 each do not extend to a curved-surface formation range of the chamfer portion 19. The reason for this is that since the thickness of an underlayer of the external electrode 17 provided on the chamfer portion 19 is decreased, when the extending portion 25 is exposed to this area, the moisture resistance may be degraded in some cases.

As an electrical conductive material for the internal electrodes 10 and 11, for example, Ni, Cu, Ag, Pd, a Ag—Pd alloy, or Au may be used.

The thickness of each of the internal electrodes 10 and 11 is preferably about 0.3 μm to about 2.0 μm, for example. In addition, the extending portions 25 and 29 each may have a thickness larger than that of each of the facing portions 24 and 28. Accordingly, the step of the laminate portion 12, which is liable to be generated in association with the extending portions 25 and 29, can be minimized.

As a ceramic material forming the ceramic layer 9 and the ceramic side surface layers 13 and 14, for example, a dielectric ceramic containing $BaTiO_3$, $CaTiO_3$, $SrTiO_3$, $CaZrO_3$, or the like as a primary component can be used. Accessory components, such as a Mn compound, a Mg compound, a Si compound, a Co compound, a Ni compound, and a rare earth element compound, may be added to the dielectric ceramic, if needed.

The ceramic material forming the ceramic side surface layers 13 and 14 preferably includes at least the same primary component as that of the ceramic material forming the ceramic layer 9. In this case, ceramic materials having the same composition are most preferably used for the ceramic layer 9 and the ceramic side surface layers 13 and 14.

Incidentally, the present invention can also be applied to multilayer ceramic electronic components other than the multilayer ceramic capacitor. When the multilayer ceramic electronic component is, for example, a piezoelectric element, a piezoelectric ceramic, such as a PZT ceramic, is preferably used, and in the case of a thermistor, a semiconductor ceramic, such as a spinel ceramic, is preferably used.

Although the external electrodes 17 and 18 are preferably provided at least on the pair of end surfaces 7 and 8, respectively, of the element body 2 as described above, in this preferred embodiment, the external electrodes are preferably arranged to extend from the end surfaces 7 and 8 to portions of the principal surfaces 3 and 4 and portions of the side surfaces 5 and 6, respectively.

Although not shown in the figure, the external electrodes 17 and 18 each preferably include an underlayer and a plating layer provided thereon. As an electrical conductive material for the underlayer, for example, Cu, Ni, Ag, Pd, an Ag—Pd alloy, or Au may be used.

The underlayer may be formed by using a co-firing method in which an electrical conductive paste is applied on a green element body 2 and is then simultaneously fired therewith or a post-firing method in which an electrical conductive paste is applied on the fired element body 2 and is then baked. Alternatively, the underlayer may be formed by direct plating or may be formed by curing an electrical conductive resin containing a thermosetting resin.

In addition, when the conditions of the curvature radius of the curved surface of the chamfer portion 19 which will be described later are taken into consideration, in the specific case in which the underlayer is formed using an electrical conductive paste, a significant effect can be obtained by a preferred embodiment of the present invention.

The thickness of the underlayer is preferably about 10 μm to about 150 μm at the thickest position, for example.

As a metal forming the plating layer provided on the underlayer, for example, a metal selected from the group consisting of Cu, Ni, Sn, Pb, Au, Ag, Pd, Bi, and Zn or an alloy containing at least one of the aforementioned metals may be used. The plating layer may include a plurality of layers. When the plating layer includes a plurality of layers as described above, a two-layer structure of Ni plating and Sn plating provided thereon is preferable. In addition, the thickness of the plating layer is preferably about 1 μm to about 15 μm per layer, for example.

Between the underlayer and the plating layer, an electrical conductive resin layer for stress relaxation may also be provided.

As clearly shown in FIG. 4, the side 22 of the facing portion 24 of the internal electrode 10 is located on an interface 30 between the laminate portion 12 and the ceramic side surface layer 13. As in the case described above, the side 26 of the facing portion 28 of the internal electrode 11 is located on the interface 30 between the laminate portion 12 and the ceramic side surface layer 13. Therefore, the gap dimension Wg from each of the sides 22 and 26 of the facing portions 24 and 28 of the internal electrodes 10 and 11, respectively, to the side surface of the element body 2 corresponds to the thickness of the ceramic side surface layer 13.

In the relationship with the curvature radius Rd of the curved surface of the chamfer portion 19, the gap dimension Wg is set so as to satisfy Wg<Rd. That is, since the curvature radius Rd is larger than the gap dimension Wg, an intersection line 32 extending from the interface 30 between the laminate portion 12 and the ceramic side surface layer 13 and the external surface of the element body 2 is located within the curved-surface formation range of the chamfer portion 19.

Although not shown in FIG. 4, the same positional relationship as described above is also satisfied in each of the chamfer portions 19 located at an upper right, a lower left, and a lower right of the element body 2 shown in FIG. 3.

As described above, if Wg<Rd is satisfied, the ceramic side surface layers 13 and 14 can be sufficiently prevented from being peeled off from the laminate portion 12.

In particular, the gap dimension Wg preferably satisfies 15 μm≤Wg. When Wg is about 15 μm or more, cracks generated in a gap portion can be more reliably prevented. In addition, in order to achieve miniaturization of the multilayer ceramic capacitor and an increase in capacity thereof, Wg≤35 μm is preferably satisfied.

The curvature radius Rd of the curved surface of the chamfer portion 19 preferably satisfies 55 μm≤Rd. When Rd is about 55 μm or more, cracks and/or chips can be more reliably prevented from being generated in the element body 2. In addition, in order to more reliably prevent the thickness of the underlayer of each of the external electrodes 17 and 18 provided on the chamfer portions 19 from being locally decreased, Rd≤95 μm is preferably satisfied. As a result, the moisture resistance can be more reliably prevented from being degraded.

The distance D from the side 22 of the facing portion 24 to the end of the exposure end 15 preferably satisfies 90 μm≤D. Since moisture which may enter between the end of the external electrode 17 and the element body 2 is not likely to reach the exposure end 15 when D is about 90 μm or more, the moisture resistance can be more reliably prevented from being degraded.

When Wg, Rd, and D are measured from the multilayer ceramic capacitor 1 as a finished product, in a surface parallel or substantially parallel to the principal surfaces 3 and 4 which is obtained by cutting the element body 2 at approximately one-half height thereof, the curvature radiuses Rd at the four corner portions, the gap dimensions Wg in the two gap regions, and the distance D from the side of the facing portion of the internal electrode to the end of the exposure end may be measured. In addition, in the relationship between each corner portion and each gap region, it may be confirmed that Wg<Rd is satisfied, Rd<Wg+D is satisfied, each Rd satisfies 55 μm≤Rd, and each Wg satisfies 15 μm≤Wg.

Next, a method for manufacturing the multilayer ceramic capacitor 1 described above will be described with reference to FIGS. 6A to 9.

First, ceramic green sheets to be formed into the ceramic layers 9, an electrical conductive paste for the internal electrodes 10 and 11, ceramic green sheets for the ceramic side surface layers 13 and 14, and an electrical conductive paste for the external electrodes 17 and 18 are prepared. Binders and solvents are contained in these ceramic green sheets and the electrical conductive pastes, and as these binders and solvents, known organic binders and organic solvents can be used, respectively.

Figure 6A:
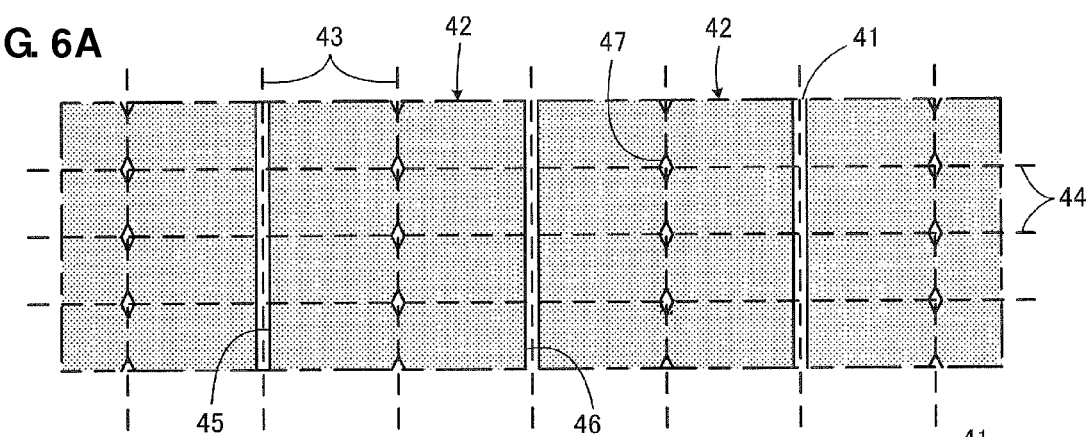
FIGS. 6A and 6B are plan views showing ceramic green sheets on each of which internal electrode patterns are formed, which are prepared to manufacture the multilayer ceramic capacitor shown in FIG. 1.
Figure 6B:
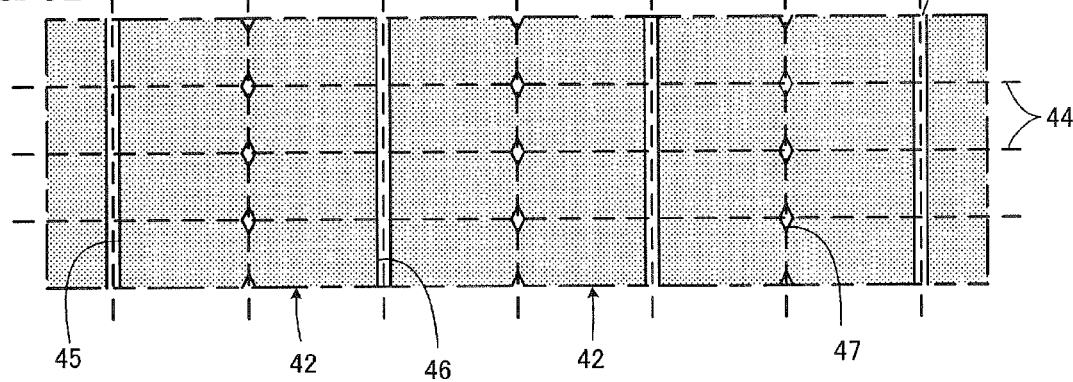

Next, as shown in FIGS. 6A and 6B, the electrical conductive paste is printed on ceramic green sheets 41, for example, by a screen printing method, to have predetermined patterns. Accordingly, the ceramic green sheets 41 on each of which internal electrode patterns 42 to be used as the internal electrodes 10 and 11 are formed are obtained.

According to this preferred embodiment, a plurality of lines of internal electrode patterns 42 each having a substantially belt shape is formed on each ceramic green sheet 41. In FIGS. 6A and 6B, imaginary cutting lines 43 in a longitudinal direction (up and down direction in FIGS. 6A and 6B) in which the belt-shaped internal electrode patterns 42 extend and imaginary cutting lines 44 in a width direction (left and right direction in FIGS. 6A and 6B) perpendicular or substantially perpendicular thereto are shown. The belt-shaped internal electrode pattern 42 has a shape in which a plurality of sets each including the two internal electrodes 10 and 11 connected to each other at the respective extending portion 25 and 29 is arranged along the longitudinal direction.

The belt-shaped internal electrode pattern 42 includes one pair of sides 45 and 46 linearly extending along the longitudinal direction. In addition, in each belt-shaped internal electrode pattern 42, rhombic hole portions 47, in each of which no internal electrode pattern is formed, are arranged at the center in the width direction with predetermined pitches along the longitudinal direction. This structure is derived from the shapes of the extending portions 25 and 29 described above.

Figure 7:
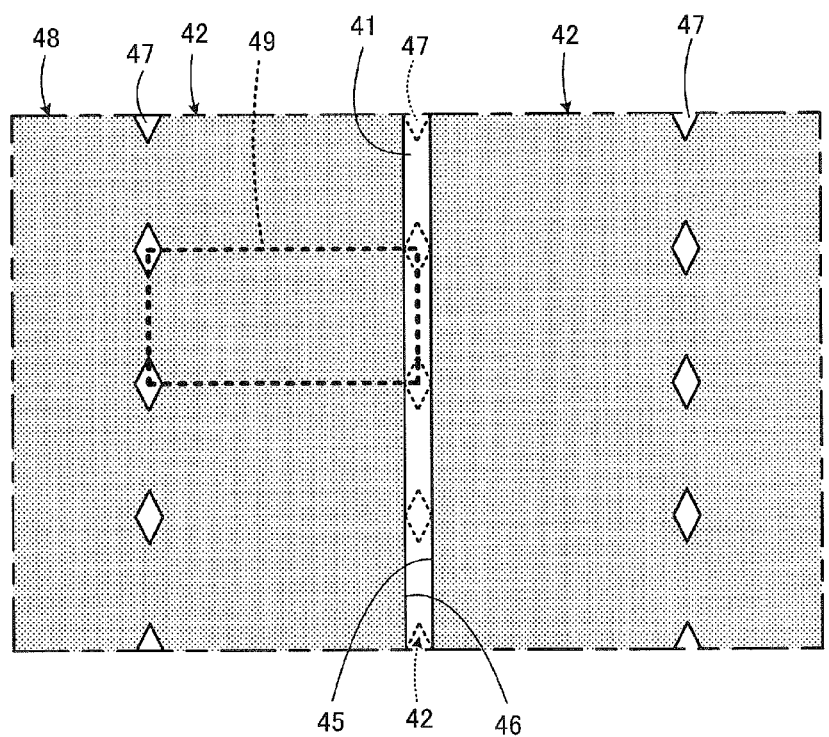
FIG. 7 is an enlarged plan view showing the state in which the ceramic green sheets shown in FIGS. 6A and 6B are laminated.

Next, a predetermined number of the ceramic green sheets 41 on which the internal electrode patterns 42 are formed as described above are laminated to each other in a predetermined order to form a laminate, and a predetermined number of ceramic green sheets for external layers on which no electrical conductive paste is printed are laminated on each of the top and the bottom of the above laminate, so that a mother block 48, a portion of which is shown in FIG. 7, is formed. FIG. 7 shows the state of the mother block 48 obtained by removing the ceramic green sheets for external layers provided on the ceramic green sheets 41 on which the internal electrode patterns 42 are formed.

In the laminating step described above, as shown in FIGS. 6A and 6B, the ceramic green sheets 41 are laminated to each other while being shifted by predetermined intervals, each of which is about half of the width direction dimension of the internal electrode pattern 42, along the width direction of the belt-shaped internal electrode pattern 42.

Next, the mother block 48 is pressed in the laminating direction by a method, such as hydrostatic pressure pressing, if needed.

Figure 8:
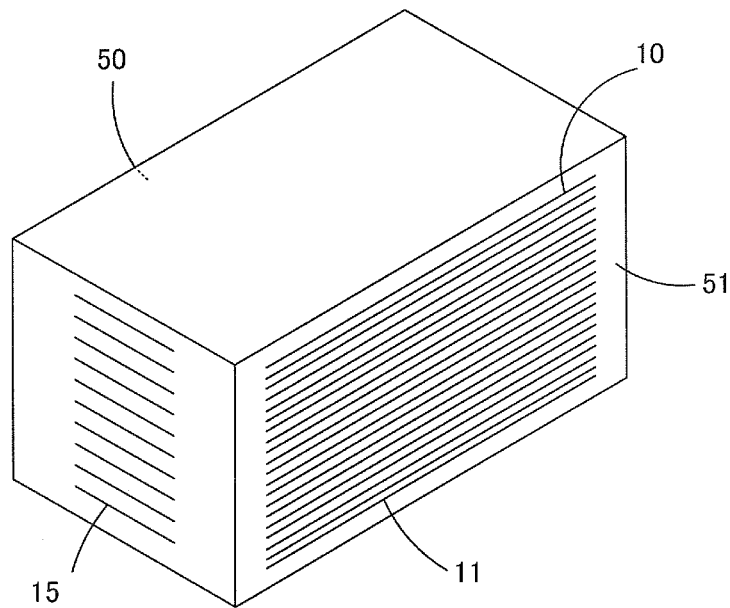
FIG. 8 is a perspective view showing the appearance of a green chip obtained by cutting a mother block formed by laminating the ceramic green sheets shown in FIGS. 6A, 6B and 7.

Next, the mother block 48 is cut along the imaginary cutting lines 43 in the longitudinal direction and the imaginary cutting lines 44 in the width direction shown in FIGS. 6A and 6B, and a green chip 49 as shown in FIG. 8 is obtained. As shown in FIG. 7, an area of the mother block 48 to be formed into the green chip 49 is surrounded by the dotted line.

As shown in FIGS. 6A, 6B and 7, one imaginary cutting line 43 in the longitudinal direction is located to equally divide the belt-shaped internal electrode pattern 42 into two portions in the width direction, that is, is located to equally divide the hole portion 47 into two portions in the width direction, and on the other hand, another imaginary cutting line in the longitudinal direction adjacent to the imaginary cutting line 43 is located so as to equally divide an area between the sides 45 and 46 of adjacent internal electrode patterns 42 into two portions in the width direction.

As shown in FIG. 8, the green chip 49 includes parallel or substantially parallel side surfaces 50 and 51 located inside and parallel to the side surfaces 5 and 6 of the element body 2. These side surfaces 50 and 51 are formed from cut surfaces along the imaginary cutting lines 44 in the width direction described above. The green chip 49 corresponds to the laminate portion 12 at a green stage and has a laminate structure including a plurality of green ceramic layers 9 and a plurality of pairs of green internal electrodes 10 and 11.

In general, as is the green chip 49 or the laminate portion 12 described above, in a laminate structure including ceramic layers and internal electrodes without side gap regions, the number of areas at which the ceramic layers are adhered to each other is decreased, and hence, delamination is liable to occur. In addition, the present inventors discovered that delamination is liable to occur particularly at a corner of the extending portion of the internal electrode (which is exposed to the corner portion of the green chip or the laminate portion after cutting) in the vicinity of each of the external layers (upper and lower ceramic layers on which the internal electrodes are not formed). The reason for this is estimated that a stress is liable to be concentrated when the mother block is cut to have a predetermined dimension, and a corner portion having a small adhesion area is liable to function as a starting point of delamination.

Hence, as in this preferred embodiment, when the widths of the exposure ends 15 and 16 are made smaller than the widths of the facing portions 24 and 28, respectively, so that the corners of the extending portions 25 and 29 of the internal electrodes 10 and 11 are withdrawn inside, the above adverse influence can be significantly reduced and minimized, and as a result, the delamination can be prevented from being generated.

Furthermore, since margin regions generated at the two sides of the extending portions 25 and 29 are adhered to each other in the lamination direction, the delamination can also be prevented from being generated.

Figure 9:
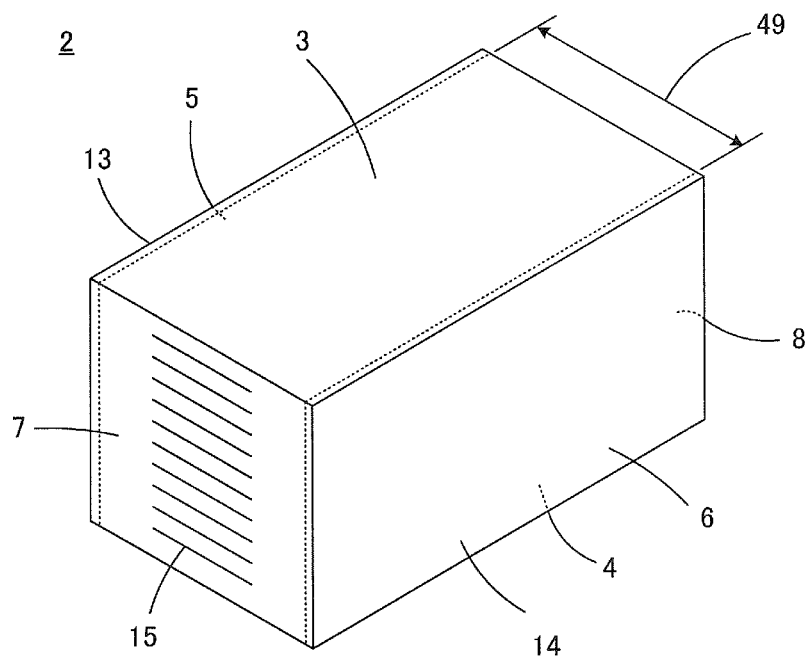
FIG. 9 is a perspective view showing the state in which ceramic side surface layers are formed on the green chip shown in FIG. 8.

Next, as shown in FIG. 9, green ceramic side surface layers 13 and 14 defining the side surfaces 5 and 6, respectively, of the element body 2 are formed on the side surfaces 50 and 51 of the green chip 49, thereby forming the green element body 2 before polishing.

Hence, a green ceramic material is supplied on the parallel side surfaces 50 and 51 of the green chip 49. For the supply of this green ceramic material, the above ceramic green sheets are used, and these ceramic green sheets are adhered on the side surfaces 50 and 51 of the green chip 49. Alternatively, a ceramic paste may be applied on the side surfaces 50 and 51 of the green chip 49, for example, by a printing method, such as a screen printing method, an ink jet method, a coating method, such as a gravure coating method, or a spray method. In the method for adhering ceramic green sheets among these supply methods described above, since a separate object is adhered to the green chip 49, the adhesive strength is liable to decrease as compared with that obtained by the other methods; hence, the advantageous effects of preferred embodiments of the present invention can be particularly achieved. Since the ceramic side surface layers 13 and 14 are formed, the green internal electrodes 10 and 11 exposed to the side surfaces 50 and 51 are covered therewith.

Next, a polishing step is performed on the green element body 2. As the polishing method, for example, barrel polishing may be used. The chamfer portions 19 to 21 described above are formed by this polishing method.

In this polishing step, the intersection line 32 extending from each of the interfaces of the green chip 49 and the ceramic side surface layers 13 and 14 (corresponding to each of the interfaces 30 and 31 of the laminate portion 12 and the ceramic side surface layers 13 and 14, see FIGS. 3 to 5) and each external surface of the green element body 2 is made to be located within the curved-surface formation range of the chamfer portion 19. In other words, the dimension of the gap region formed by each of the green ceramic side surface layers 13 and 14 (corresponding to the gap dimension Wg) is preferably set smaller than the curvature radius Rd of the curved surface of the chamfer portion 19.

When the polishing step is performed so as to satisfy the above conditions, since the green ceramic material of the green chip 49 and/or the ceramic side surface layers 13 and 14 is extended so as to fill the interfaces between the green chip 49 and the ceramic side surface layers 13 and 14, this green ceramic material functions as so-called "putty", and as a result, the adhesive strength between the green chip 49 and each of the ceramic side surface layers 13 and 14 is increased.

In this polishing step, as described above, the exposure ends 15 and 16 of the green internal electrodes 10 and 11 exposed to the end surfaces 7 and 8 of the green element body are each formed so as not to extend to the curved-surface formation range of the chamfer portion 19.

Next, the green element body 2 is fired. Although depending on the ceramic material of the ceramic green sheet 41 and the ceramic side surface layers 13 and 14 and the metal material of the internal electrodes 10 and 11, a firing temperature is preferably set, for example, in a range of about 900° C. to about 1,300° C.

Next, the underlayers of the external electrodes 17 and 18 are formed by applying an electrical conductive paste on the two ends surfaces 7 and 8 of the fired element body 2, followed by baking. A baking temperature is preferably approximately about 700° C. to about 900° C., for example.

In addition, if needed, plating is performed on the surfaces of the underlayers of the external electrodes 17 and 18, and the multilayer ceramic capacitor 1 shown in FIG. 1 is completed.

In the first preferred embodiment described above, the shapes of the extending portions 25 and 29 of the internal electrodes 10 and 11 can be variously changed by changing the shape of the hole portion 47.

Next, non-limiting experimental examples carried out in order to confirm the effect in the range of preferred embodiments of the present invention or in a more preferable range will be described.

According to the first preferred embodiment described above, a multilayer ceramic capacitor used as a sample was formed. In this example, the dimensions of the multilayer ceramic capacitor used as the sample were 2.0 mm×1.25 mm×1.25 mm. In addition, a width dimension of 1.25 mm was a target value when Wg was set to 30 μm, and when the value of Wg is changed, the width dimension is changed in an amount corresponding thereto. In addition, the ceramic layer was formed from a ceramic primarily composed of $BaTiO_3$ to have a thickness of 0.8 μm. The internal electrode was formed using Ni as an electrical conductive component to have a thickness to 0.5 μm, and the number of lamination layers was set to 900. In addition, in a reducing atmosphere, firing was performed at a highest temperature of 1,200° C. The exterior electrodes were each formed by performing Ni plating and Sn plating on a Cu-baked film.

The multilayer ceramic capacitors as described above were variously formed by various changing the gap dimension Wg from the side of the facing portion of the internal electrode to the side surface of the element body, the curvature radius Rd of the curved surface of the chamfer portion, and the distance D from the side of the facing portion to the end of the exposure end as shown in Table 1.

In addition, by using the multilayer ceramic capacitors of the respective samples, as shown in Table 1, "gap peeling", "moisture resistant defect", "external layer peeling", "gap crack", and "chip and crack" were evaluated.

The presence of peeling at the gap portion was evaluated by observing the sample using a stereoscopic microscope at a magnification of 50 times, and as the "gap peeling", the ratio of samples in which peeling occurred to 300 samples was obtained. As the stereoscopic microscope, SMZ645 manufactured by Nikon Corp. was used. The stereoscopic microscope was also used for other evaluations.

After a voltage of 4 V was applied to the sample for 1,000 hours under the environment of a temperature of 85° C. and a relative humidity of 85%, a sample having an insulating resistance of less than 0.13 MΩ was regarded as a defective, and the ratio of the defective samples to 100 samples was obtained as the "moisture resistance defect". For the insulation resistance measurement, 4-Channel High Resistance Meter 4349B manufactured by Agilent was used.

The presence of peeling of the ceramic layer in the vicinity of the external layer was evaluated by observing the sample using a stereoscopic microscope at a magnification of 50 times, and the ratio of samples in which peeling occurred to 300 samples was obtained as the "external layer peeling".

The "gap crack" is a defect that indicates breakage of the ceramic green sheet forming the ceramic side surface layers 13 and 14 and is generated in the surface in the form of a linear scratch or the like. This "gap crack" was evaluated by observing 300 samples using a stereoscopic microscope at a magnification of 50 times whether a crack was present at the gap portion or not.

The presence of chip and crack in the sample particularly at the corner portions thereof was observed using a stereoscopic microscope at a magnification of 50 times, and the ratio of samples in which chip and crack were generated to 300 samples was obtained as the "chip and crack".

TABLE 1

| SAMPLE NO. | Wg (μm) | Rd (μm) | D (μm) | GAP PEELING (%) | MOISTURE RESISTANT DEFECT (%) | EXTERNAL LAYER PEELING (%) | GAP CRACK | CHIP AND CRACK (%) |
|---|---|---|---|---|---|---|---|---|
| 1 | 30 | 70 | 0 | 0 | 5 | 3 | NO | 0 |
| 2 | 30 | 70 | 40 | 0 | 1 | 0 | NO | 0 |
| 3 | 30 | 70 | 90 | 0 | 0 | 0 | NO | 0 |
| 4 | 30 | 70 | 150 | 0 | 0 | 0 | NO | 0 |
| 5 | 30 | 70 | 440 | 0 | 0 | 0 | NO | 0 |
| 6 | 5 | 35 | 90 | 0 | 0 | 0 | YES | 3 |
| 7 | 15 | 35 | 90 | 0 | 0 | 0 | NO | 5 |

TABLE 1-continued

| SAMPLE NO. | Wg (μm) | Rd (μm) | D (μm) | GAP PEELING (%) | MOISTURE RESISTANT DEFECT (%) | EXTERNAL LAYER PEELING (%) | GAP CRACK | CHIP AND CRACK (%) |
|---|---|---|---|---|---|---|---|---|
| 8 | 25 | 35 | 90 | 0 | 0 | 0 | NO | 3 |
| 9 | 35 | 35 | 90 | 1 | 1 | 0 | NO | 2 |
| 10 | 45 | 35 | 90 | 3 | 2 | 0 | NO | 5 |
| 11 | 5 | 55 | 90 | 0 | 0 | 0 | YES | 0 |
| 12 | 15 | 55 | 90 | 0 | 0 | 0 | NO | 0 |
| 13 | 25 | 55 | 90 | 0 | 0 | 0 | NO | 0 |
| 14 | 35 | 55 | 90 | 0 | 0 | 0 | NO | 0 |
| 15 | 5 | 65 | 90 | 0 | 0 | 0 | YES | 0 |
| 16 | 15 | 65 | 90 | 0 | 0 | 0 | NO | 0 |
| 17 | 25 | 65 | 90 | 0 | 0 | 0 | NO | 0 |
| 18 | 35 | 65 | 90 | 0 | 0 | 0 | NO | 0 |
| 19 | 5 | 80 | 90 | 0 | 0 | 0 | YES | 0 |
| 20 | 15 | 80 | 90 | 0 | 0 | 0 | NO | 0 |
| 21 | 25 | 80 | 90 | 0 | 0 | 0 | NO | 0 |
| 22 | 35 | 80 | 90 | 0 | 0 | 0 | NO | 0 |
| 23 | 5 | 95 | 90 | 0 | 1 | 0 | YES | 0 |
| 24 | 15 | 95 | 90 | 0 | 0 | 0 | NO | 0 |
| 25 | 25 | 95 | 90 | 0 | 0 | 0 | NO | 0 |
| 26 | 35 | 95 | 90 | 0 | 0 | 0 | NO | 0 |
| 27 | 5 | 115 | 90 | 0 | 5 | 0 | YES | 0 |
| 28 | 15 | 115 | 90 | 0 | 3 | 0 | NO | 0 |
| 29 | 25 | 115 | 90 | 0 | 1 | 0 | NO | 0 |

According to Samples 3 to 5, 12 to 14, 16 to 18, 20 to 22, and 24 to 26, the conditions, Wg<Rd, Rd<Wg+D, 15 μm≤Wg, and 55 μm≤Rd, were satisfied, and the defects, that is, the "gap peeling", the "moisture resistance defect", the "external layer peeling", the "gap crack", and the "chip and crack", were not generated.

On the other hand, according to Samples 1 and 2, Rd≥Wg+D held, the "moisture resistance defect" was generated, and in particular, according to Sample 1, the "external layer peeling" was also generated.

According to Samples 6 to 10, Rd was less than 55 μm. Therefore, the "chip and crack" could not be completely prevented. Among Samples 6 to 10, although the "gap peeling" and the "moisture resistance defect" could be prevented in Samples 6 to 8 in which Wg<Rd was satisfied, according to Samples 9 and 10 in which Wg≥Rd held, the "gap peeling" and the "moisture resistance defect" could not be completely prevented.

According to Samples 11, 15, 19, 23, and 27 besides Sample 6 described above, since Wg was less than 15 μm, the "gap crack" could not be completely prevented.

Besides Samples 23 and 27 described above, according to Samples 28 and 29, since Rd≥Wg+D held, the "moisture resistance defect" could not be completely prevented.

Figure 10:
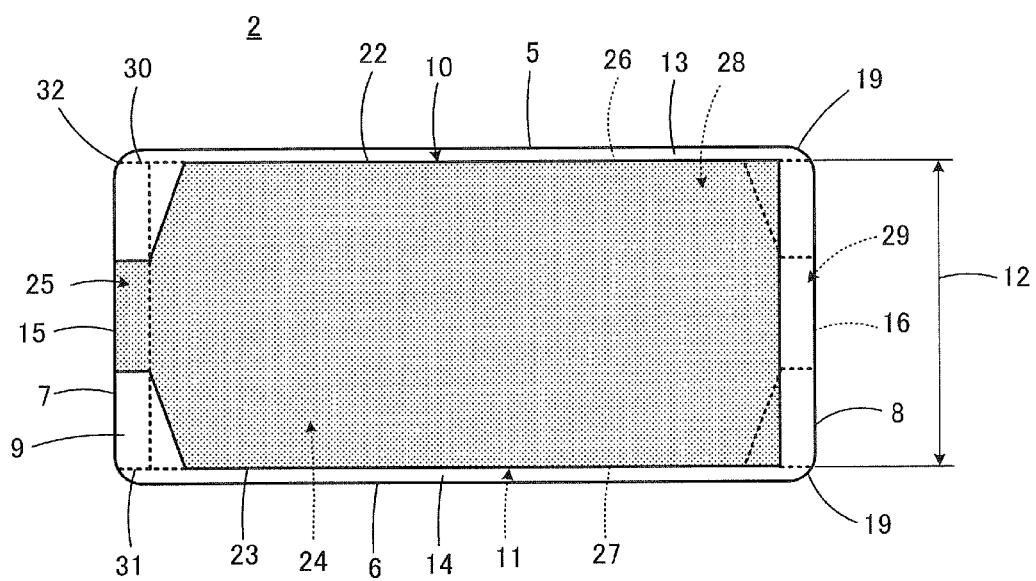
FIG. 10 is a plan view corresponding to FIG. 3 and showing the internal structure of the element body of the multilayer ceramic capacitor as a multilayer ceramic electronic component according to a second preferred embodiment of the present invention.
Figure 11A:
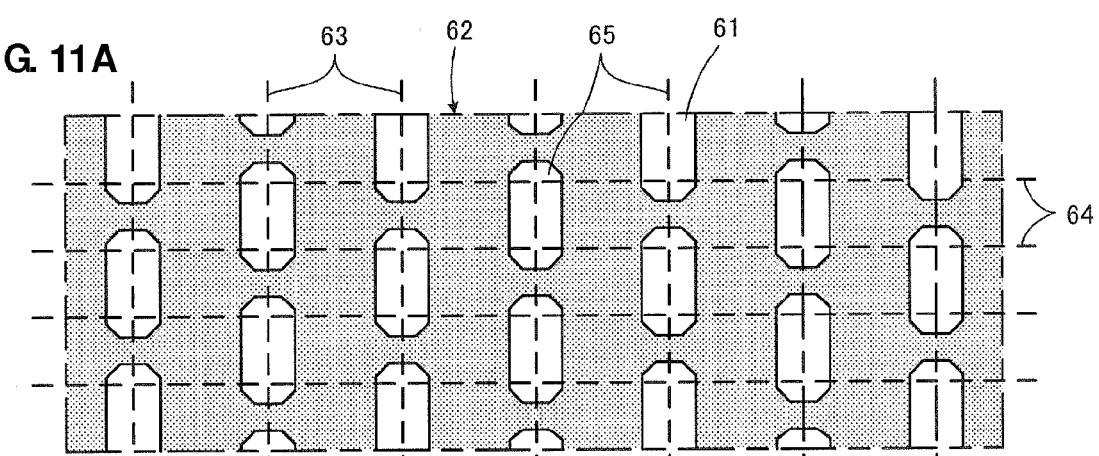
FIGS. 11A and 11B are plan views corresponding to FIGS. 6A and 6B and showing ceramic green sheets on each of which internal electrode patterns are formed, which are prepared to manufacture the multilayer ceramic capacitor shown in FIG. 10.
Figure 11B:
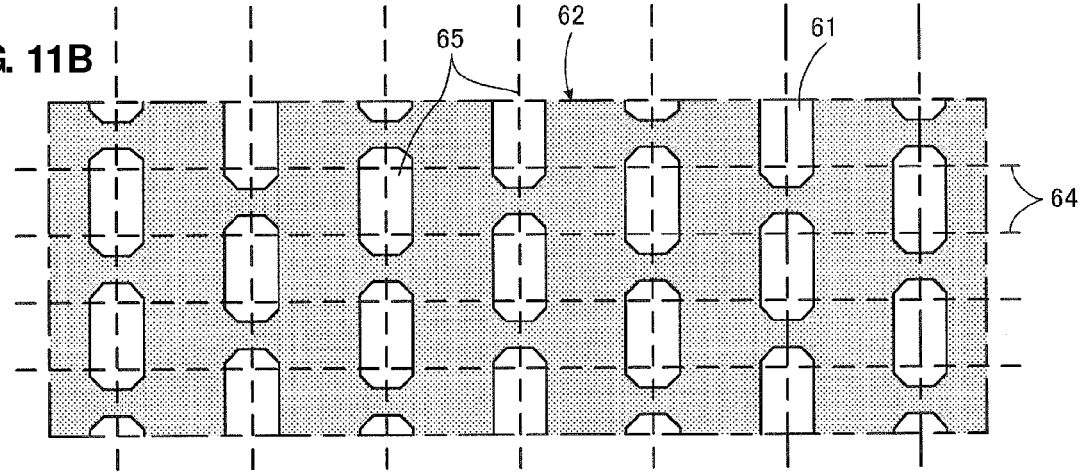
Figure 12:
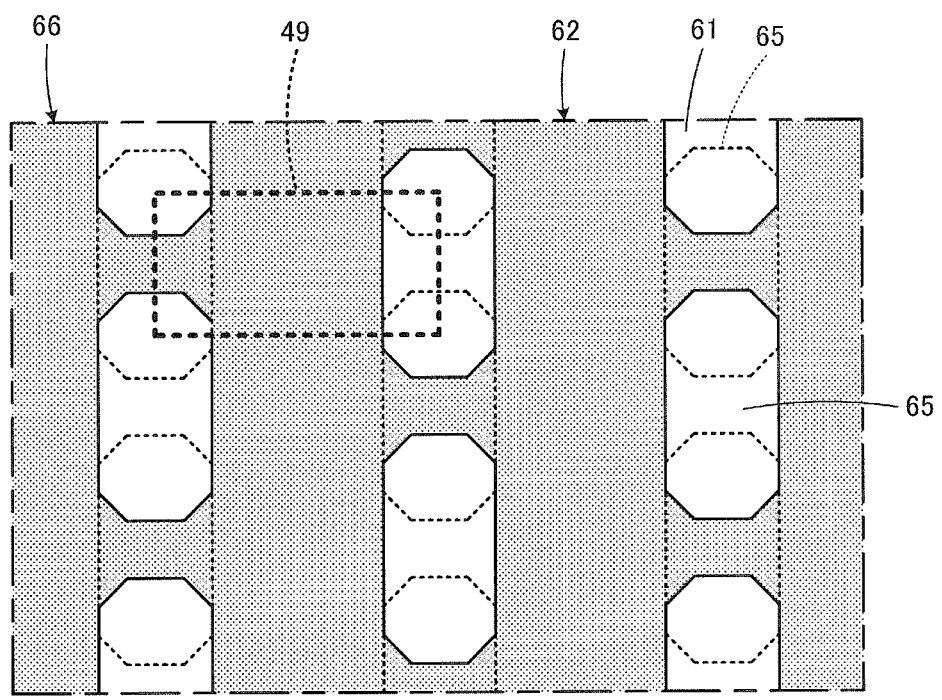
FIG. 12 is an enlarged plan view corresponding to FIG. 7 and showing the state in which the ceramic green sheets shown in FIGS. 11A and 11B are laminated.

Next, a second preferred embodiment of the present invention will be described with reference to FIGS. 10 to 12. Incidentally, FIG. 10 corresponds to FIG. 3, FIGS. 11A and 11B correspond to FIGS. 6A and 6B, and FIG. 12 corresponds to FIG. 7. In FIGS. 10 to 12, elements corresponding to each other shown in the corresponding figures are designated by the same reference numerals, and a duplicate description will be omitted.

According to the second preferred embodiment, as shown in FIG. 10, the extending portions 25 and 29 of the internal electrodes 10 and 11 have widths smaller than those of the facing portions 24 and 28 and each extend by a predetermined width. In addition, the regions of the facing portions 24 and 28 extending to the extending portions 25 and 29 have widths which are gradually decreased so as to be equal to the widths of the extending portions 25 and 29.

In order to obtain the internal electrodes 10 and 11 described above, ceramic green sheets 61 on each of which internal electrode patterns 62 as shown in FIGS. 11A and 11B are formed are prepared. In FIGS. 11A and 11B, imaginary cutting lines 63 extending in the up and down direction and imaginary cutting lines 64 extending in the left and right direction perpendicular or substantially perpendicular thereto are shown. The internal electrode pattern 62 has a substantially network shape, and areas each to be formed into the facing portion 24 of the internal electrode 10 and areas each to be formed into the facing portion 28 of the internal electrode 11 are alternately connected to each other in the up and down direction.

In the network-shape internal electrode pattern 62, longitudinal octagonal hole portions 65, in each of which no internal electrode pattern is formed, are arranged in a staggered manner in the up and down direction. Between adjacent hole portions 65 arranged in the up and down direction, areas to be formed into the extending portions 25 and 29 are located.

In laminating the ceramic green sheets 61 described above, as shown in FIGS. 11A and 11B, the ceramic green sheets 61 are laminated to each other while being shifted along the left and right direction so as to shift the internal electrode patterns 62 with predetermined intervals, each of which is the space between the hole portions 65 in the left and right direction.

An enlarged mother block 66 obtained by the above lamination is partially shown in FIG. 12. The mother block 66 is cut along the imaginary cutting lines 63 and 64 shown in FIGS. 11A and 11B, and the green chip 49 as shown in FIG. 8 is obtained. As shown in FIG. 12, the area of the mother block 66 to be formed into the green chip 49 is surrounded by the dotted line.

As shown in FIGS. 11A, 11B and 12, the imaginary cutting lines 63 extending in the up and down direction are located so as to equally divide the respective hole portions 65 into two portions in the left and right direction, and adjacent two imaginary cutting lines 64 in the left and right direction are located so as to intersect two positions of each hole portion 65.

In the second preferred embodiment described above, the shapes of the extending portions 25 and 29 of the internal electrodes 10 and 11 and the shapes of the ends of the facing portions 24 and 28 extending therefrom can be variously changed by changing the shape of the hole portion 65. For example, if the shape of the hole portion 65 is changed into a rectangle, the shapes of the internal electrodes 10 and 11 as shown in the following third preferred embodiment can be obtained.

Figure 13:
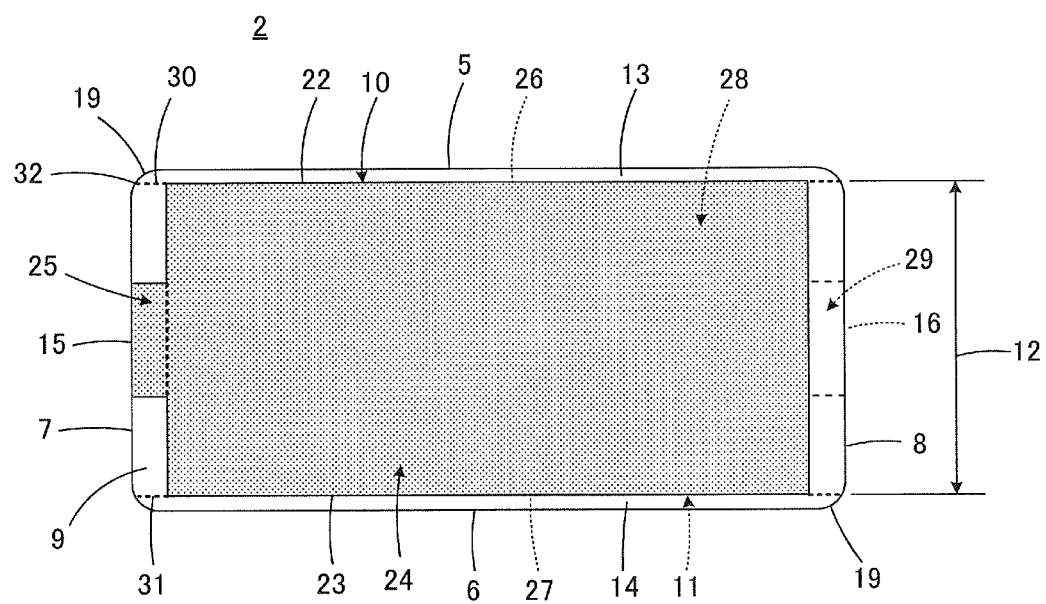
FIG. 13 is a plan view corresponding to FIG. 3 and showing the internal structure of the element body of the multilayer ceramic capacitor as a multilayer ceramic electronic component according to a third preferred embodiment of the present invention.

Next, the third preferred embodiment of the present invention will be described with reference to FIG. 13. Incidentally, FIG. 13 corresponds to FIG. 3. In FIG. 13, elements corresponding to the elements shown in FIG. 3 are designated by the same reference numerals, and a duplicate description will be omitted.

According to the third preferred embodiment, as in the case of the second preferred embodiment, the extending portions 25 and 29 of the internal electrodes 10 and 11 have the widths smaller than those of the facing portions 24 and 28 and each extend with a predetermined width. However, the structure is not used in which the regions of the facing portions 24 and 28 extending to the extending portions 25 and 29 have the widths which are gradually decreased.

Figure 14:
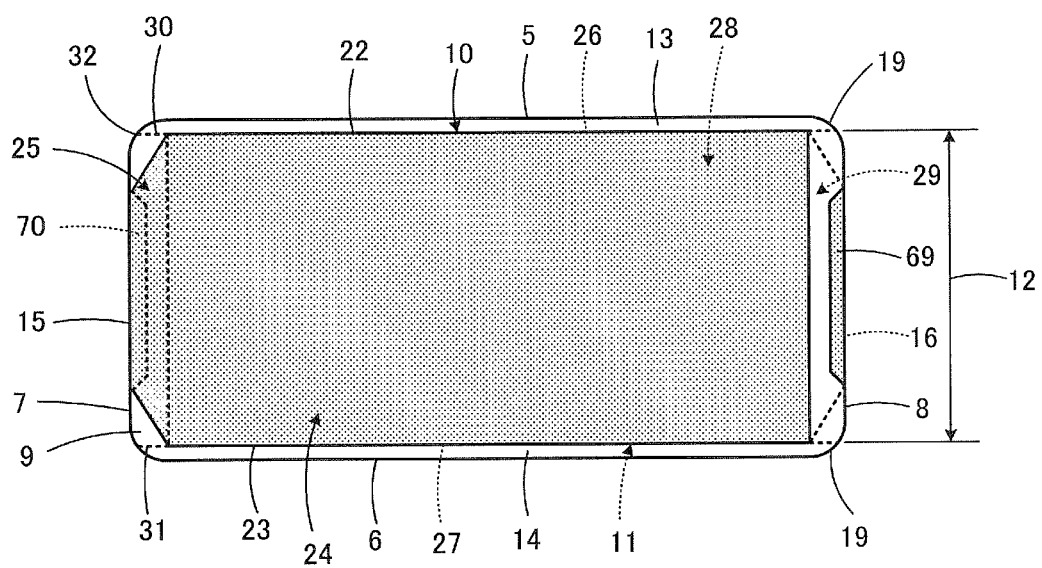
FIG. 14 is a plan view corresponding to FIG. 3 and showing the internal structure of the element body of the multilayer ceramic capacitor as a multilayer ceramic electronic component according to a fourth preferred embodiment of the present invention.
Figure 15A:
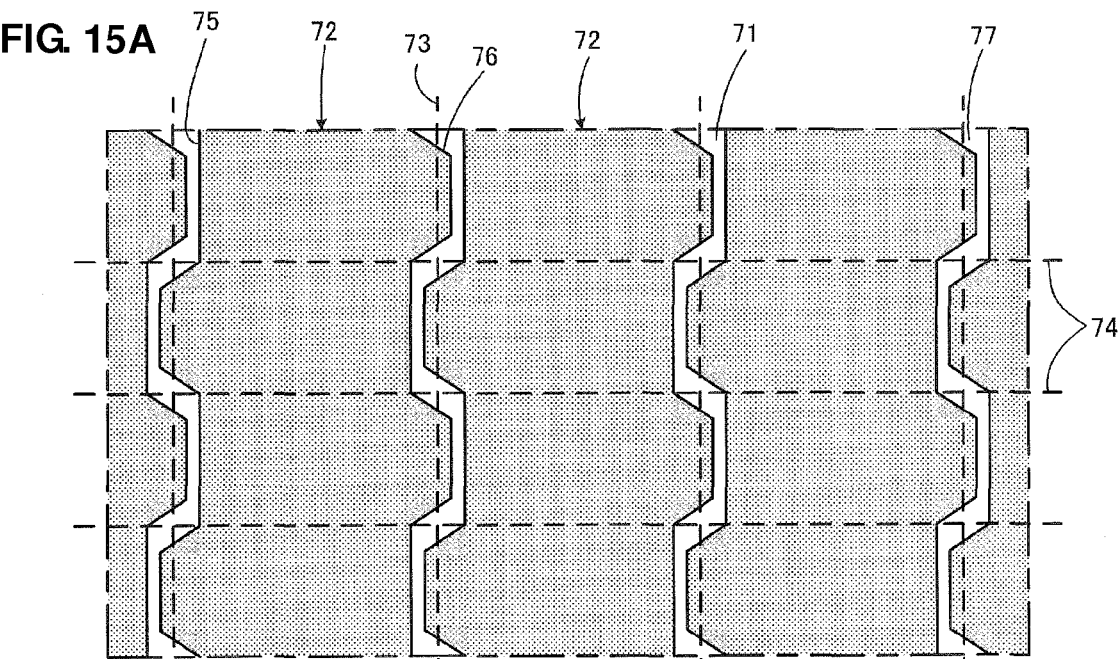
FIGS. 15A and 15B are plan views corresponding to FIGS. 6A and 6B and showing ceramic green sheets on each of which internal electrode patterns are formed, which are prepared to manufacture the multilayer ceramic capacitor shown in FIG. 14.
Figure 15B:
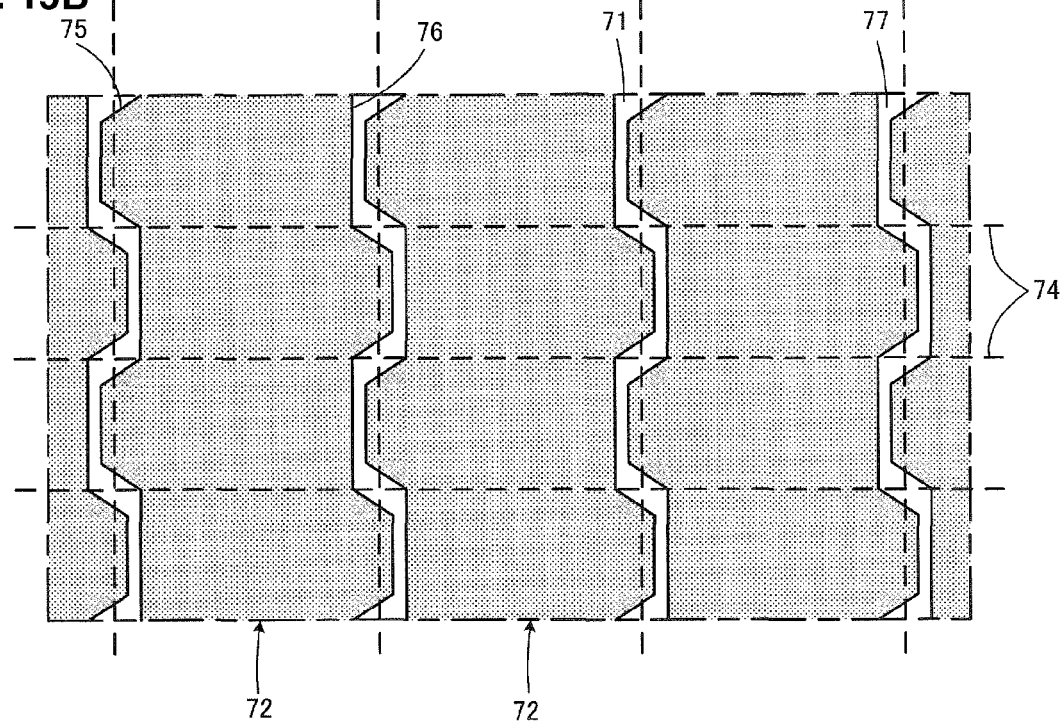
Figure 16:
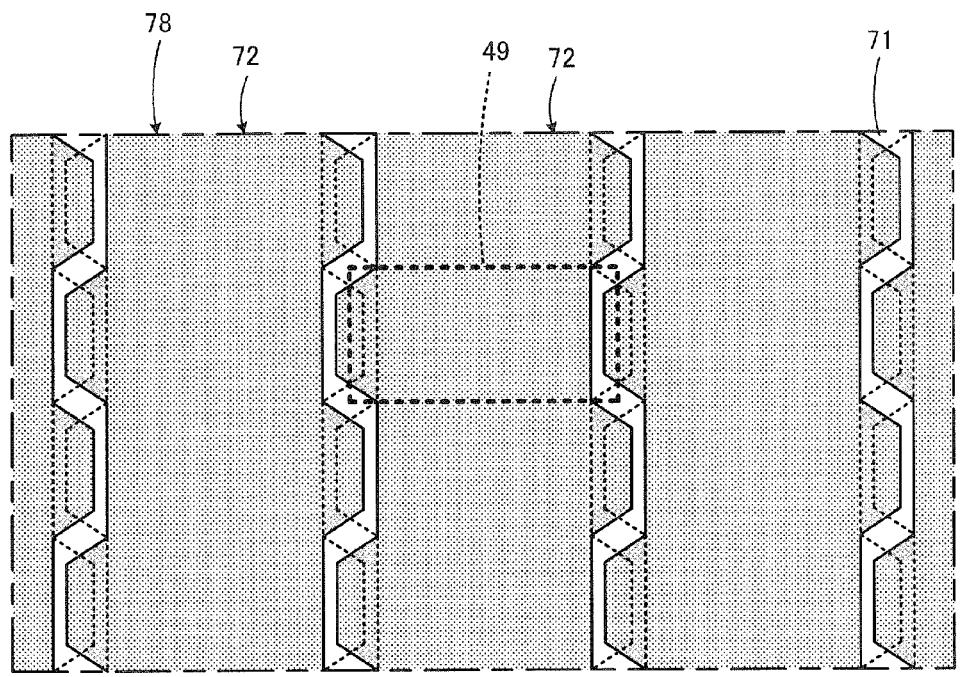
FIG. 16 is a plan view corresponding to FIG. 7 and showing the state in which the ceramic green sheets shown in FIGS. 15A and 15B are laminated.

Next, a fourth preferred embodiment of the present invention will be described with reference to FIGS. 14 to 16. In addition, FIG. 14 corresponds to FIG. 3, FIGS. 15A and 15B correspond to FIGS. 6A and 6B, and FIG. 16 corresponds to FIG. 7. In FIGS. 14 to 16, elements corresponding to each other shown in the corresponding figures are designated by the same reference numerals, and a duplicate description will be omitted.

According to the fourth preferred embodiment, as shown in FIG. 14, the exposure ends 15 and 16 of the internal electrodes 10 and 11 have widths smaller than those of the facing portions 24 and 28, and the extending portions 25 and 29 have width direction dimensions which are gradually decreased toward the end surfaces 7 and 8. Those described above are substantially the same as the case of the first preferred embodiment.

One of the unique features of the fourth preferred embodiment is that dummy electrodes 69 and 70 are exposed to the end surfaces 8 and 7, respectively.

In order to obtain the internal electrodes 10 and 11 and the dummy electrodes 69 and 70 described above, ceramic green sheets 71 on each of which a plurality of lines of internal electrode patterns 72 each having a substantially belt shape as shown in FIGS. 15A and 15B is formed are prepared. In FIGS. 15A and 15B, imaginary cutting lines 73 in a longitudinal direction (up and down direction in FIGS. 15A and 15B) in which the belt-shaped internal electrode patterns 72 extend and imaginary cutting lines 74 in a width direction (left and right direction in FIGS. 15A and 15B) perpendicular or substantially perpendicular thereto are shown. The belt-shaped internal electrode pattern 72 has the shape in which the facing portions 24 and 28 of the internal electrodes 10 and 11 are alternately connected to each other in the longitudinal direction.

The belt-shaped internal electrode pattern 72 includes a pair of zigzag sides 75 and 76 extending along the longitudinal direction so as to be engaged with adjacent internal electrode patterns 72, and between adjacent belt-shaped internal electrode patterns 72, a zigzag gap region 77 extending along the longitudinal direction is formed.

The imaginary cutting line 73 in the longitudinal direction described above is located so as to equally divide the gap region 77 into two portions in the width direction. At this stage, an area to be formed into the extending portion 25 or 29 of the internal electrode 10 or 11 is formed at one imaginary cutting line 73 side, and an area to be formed into the dummy electrode 69 or 70 is formed at the other imaginary cutting line 73 side.

In laminating the ceramic green sheets 71 described above, as shown in FIGS. 15A and 15B, the ceramic green sheets 71 are laminated to each other while being shifted by predetermined intervals, each of which is a half of the zigzag cycle of the sides 75 and 76 of the internal electrode pattern 72, in the longitudinal direction.

A mother block 78 obtained by the above lamination is partly shown in FIG. 16. The mother block 78 is cut along the imaginary cutting lines 73 and 74 shown in FIGS. 15A and 15B, and the green chip 49 as shown in FIG. 8 is obtained. As shown in FIGS. 15A and 15B, an area of the mother block 78 to be formed into the green chip 49 is surrounded by the dotted line.

When the internal electrode patterns 72 shown in FIGS. 15A, 15B and 16 are used, the dummy electrodes 69 and 70 are formed at the sides opposite to the extending portions 25 and 29, respectively, and each of the widths of the exposure ends 15 and 16 of these extending portions 25 and 29 and each of the widths of the exposure ends of the dummy electrodes 69 and 70 are approximately equal to each other.

When the dummy electrodes 69 and 70 are formed as in this preferred embodiment, the step liable to be generated at the laminate portion 12 or the green chip 49 in association with the extending portions 25 and 29 can be reduced, and the adhesive strengths of the external electrodes 17 and 18 to the element body 2 can also be increased.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   an element body including a pair of principal surfaces facing each other, a pair of side surfaces facing each other, and a pair of end surfaces facing each other, rounded chamfer portions arranged along ridgelines between the side surfaces and the end surfaces, and a plurality of ceramic layers extending in a principal surface direction and laminated in a direction perpendicular or substantially perpendicular thereto and a plurality of pairs of internal electrodes which are provided along interfaces between the ceramic layers, which each include an exposure end exposed to one of the pair of end surfaces, and which are not exposed to the side surfaces; and
   external electrodes provided at least on the pair of end surfaces of the element body so as to be electrically connected to the exposure ends of the internal electrodes; wherein
   each of the internal electrodes includes:
   a facing portion including a pair of sides parallel or substantially parallel to the side surfaces and facing an adjacent internal electrode with at least one of the ceramic layers interposed therebetween; and
   an extending portion extending from the facing portion to one of the end surfaces to define the exposure end at the end of the extending portion; wherein
   a width of the exposure end of the extending portion is smaller than a width of the facing portion when viewed in a width direction between the side surfaces; and
   when a gap dimension from one of the sides of the facing portion to one of the side surfaces of the element body is represented by Wg, a curvature radius of a curved surface of one of the chamfer portions is represented by Rd, and a distance from one of the sides of the facing portion to the exposure end is represented by D, Wg<Rd and Rd<Wg+D are satisfied; and an intersection line extending from and parallel to one of the sides of the facing portion towards one of the end surfaces intersects one of the chamfer portions at a location within the curvature radius of the curved surface of the one of the chamfer portions.

2. The multilayer ceramic electronic component according to claim 1, wherein 15 µm≤Wg and 55 µm≤Rd are satisfied.

* * * * *